United States Patent
Kong et al.

(10) Patent No.: US 12,026,881 B2
(45) Date of Patent: Jul. 2, 2024

(54) SYSTEM AND METHOD FOR JOINT ABNORMALITY DETECTION AND PHYSIOLOGICAL CONDITION ESTIMATION

(71) Applicant: SHENZHEN KEYA MEDICAL TECHNOLOGY CORPORATION, Shenzhen (CN)

(72) Inventors: Bin Kong, Charlotte, NC (US); Youbing Yin, Kenmore, WA (US); Xin Wang, Seattle, WA (US); Yi Lu, Seattle, WA (US); Haoyu Yang, Seattle, WA (US); Junjie Bai, Seattle, WA (US); Qi Song, Seattle, WA (US)

(73) Assignee: SHENZHEN KEYA MEDICAL TECHNOLOGY CORPORATION, Shenzhen (CN)

( * ) Notice: Subject to any disclaimer, the term of this patent is extended or adjusted under 35 U.S.C. 154(b) by 405 days.

(21) Appl. No.: 17/567,458

(22) Filed: Jan. 3, 2022

(65) Prior Publication Data

US 2022/0215535 A1     Jul. 7, 2022

Related U.S. Application Data

(60) Provisional application No. 63/133,754, filed on Jan. 4, 2021.

(51) Int. Cl.
| | |
|---|---|
| *G06T 7/12* | (2017.01) |
| *G06F 18/213* | (2023.01) |
| *G06F 18/214* | (2023.01) |
| *G06T 7/00* | (2017.01) |

(Continued)

(52) U.S. Cl.
CPC .......... *G06T 7/0012* (2013.01); *G06F 18/213* (2023.01); *G06F 18/214* (2023.01); *G06T 7/75* (2017.01); *G06V 10/44* (2022.01); *G06T 2207/20081* (2013.01); *G06T 2207/30104* (2013.01); *G06V 2201/03* (2022.01)

(58) Field of Classification Search
CPC ..................... G06T 7/0012; G06T 7/75; G06T 2207/20081; G06T 2207/30104; G06V 10/44; G06V 2201/03; G06F 18/214; G06F 18/213
USPC ......................................................... 382/128
See application file for complete search history.

(56) References Cited

U.S. PATENT DOCUMENTS

| | | | |
|---|---|---|---|
| 10,249,048 B1 * | 4/2019 | Wang ................ | A61B 5/02028 |
| 2009/0034814 A1 * | 2/2009 | Shinagawa ...... | G01R 33/56366 |
| | | | 382/131 |

(Continued)

*Primary Examiner* — Michael R Neff
(74) *Attorney, Agent, or Firm* — Bayes PLLC

(57) ABSTRACT

Embodiments of the disclosure provide methods and systems for joint abnormality detection and physiological condition estimation from a medical image. The exemplary method may include receiving, by at least one processor, the medical image acquired by an image acquisition device. The medical image includes an anatomical structure. The method may further include applying, by the at least one processor, a joint learning model to determine an abnormality condition and a physiological parameter of the anatomical structure jointly based on the medical image. The joint learning model satisfies a predetermined constraint relationship between the abnormality condition and the physiological parameter.

20 Claims, 8 Drawing Sheets

(51) Int. Cl.
　　　*G06T 7/73*　　　　(2017.01)
　　　*G06V 10/44*　　　(2022.01)

(56)　　　　　References Cited

U.S. PATENT DOCUMENTS

| | | | | |
|---|---|---|---|---|
| 2013/0035596 | A1* | 2/2013 | Ionasec | G06T 7/344 |
| | | | | 600/450 |
| 2019/0130578 | A1* | 5/2019 | Gulsun | G06N 3/045 |
| 2019/0362494 | A1* | 11/2019 | Wang | G06N 7/01 |
| 2022/0273180 | A1* | 9/2022 | Lavi | G06T 7/0012 |

\* cited by examiner

SYSTEM AND METHOD FOR JOINT ABNORMALITY DETECTION AND PHYSIOLOGICAL CONDITION ESTIMATION

CROSS REFERENCE TO RELATED APPLICATION

This application is based on and claims the benefit of priority of U.S. Provisional Application No. 63/133,754, filed Jan. 4, 2021, which is incorporated herein by reference in its entirety.

TECHNICAL FIELD

The present disclosure relates to the technical field of processing and analysis of medical images, more specifically, to the technical field of processing and analysis of medical images for joint abnormality detection and physiological condition estimation.

BACKGROUND

Coronary artery disease (CAD) is a critical disease in which coronary artery luminal narrowing may result in myocardial ischemia. Early and effective assessment of myocardial ischemia is important for optimal treatment planning so as to improve the quality of life and reduce medical costs. Various imaging techniques provide effective ways for the evaluation of a structure of a coronary vessel including a degree of a vessel lesion. However, anatomical vessel lesions may not necessarily lead to a significant functional hemodynamic change, and accurate diagnosis and optimal treatment cannot be achieved only based on the anatomical vessel lesions.

Patients with coronary artery narrowing or occlusion due to lesions may suffer from limited blood supply to the myocardium and may lead to myocardial ischemia. Physiological conditions could be evaluated using fractional flow reserve (FFR), instantaneous wave-free ratio (iFR), or other measurements. For example, FFR may be, for example, a ratio between mean distal lesion and aortic blood pressures under hyperemic conditions. iFR can be measured without the need for hyperemic and is emerging as an alternative index. These indices including FFR and iFR can be invasively measured by a pressure wire in a catheterization lab. Nevertheless, these methods are invasive and cause pain for patients. Thus, an image-based coronary artery disease analysis system is desirable to aid doctors in their daily procedures.

Machine learning has been used as a useful tool to model complex functions cross many domains. Recent advances in machine learning have made it possible to be applied in the analysis of CAD in terms of anatomical abnormality evaluation and physiological parameter estimation. However, existing methods tackle these two tasks (e.g., anatomical abnormality evaluation and physiological parameter estimation) separately by training an independent model for each task so that two different models are used to implement these two tasks. As a result, the two models do not take into account the correlation of these two tasks, and the predictions from these two models may be inconsistent. Additionally, the training procedure may not make the maximal use of the annotations because each of the two models is trained on a separate set of annotations for the corresponding task.

SUMMARY

The present disclosure provides a system and method for abnormality detection and physiological condition estimation from a medical image, which enables joint prediction of an abnormality on an anatomical structure (e.g., a vessel abnormality) and a functional physiological parameter of the anatomical structure based on the medical image including the anatomical structure, and significantly improves a consistency between a prediction result of the abnormality of the anatomical structure and a prediction result of the functional physiological parameter of the anatomical structure.

According to a first aspect of the present disclosure, a method for joint abnormality detection and physiological condition estimation from a medical image is provided. The method may include receiving, by at least one processor, the medical image acquired by an image acquisition device. The medical image includes an anatomical structure. The method may further include applying, by the at least one processor, a joint learning model to determine an abnormality condition and a physiological parameter of the anatomical structure jointly based on the medical image. The joint learning model satisfies a predetermined constraint relationship between the abnormality condition and the physiological parameter. The joint learning model may adopt a multi-task learning framework, or serial model(s), or a learning framework by fusing the two tasks of abnormality detection and physiological condition estimation.

According to a second aspect of the present disclosure, a system for joint abnormality detection and physiological condition estimation from a medical image is provided. The system may include a communication interface configured to receive the medical image acquired by an image acquisition device. The medical image includes an anatomical structure. The system further includes at least one processor. The at least one processor may be configured to apply a joint learning model to determine an abnormality condition and a physiological parameter of the anatomical structure jointly based on the medical image. The joint learning model satisfies a predetermined constraint relationship between the abnormality condition and the physiological parameter.

According to a third aspect of the present disclosure, a non-transitory computer-readable storage medium with computer-executable instructions stored thereon is provided. The instructions, when executed by a processor, may perform a method for joint abnormality detection and physiological condition estimation from a medical image. The method may include receiving the medical image acquired by an image acquisition device. The medical image includes an anatomical structure. The method may also include applying a joint learning model to determine an abnormality condition and a physiological parameter of the anatomical structure based on the medical image. The joint learning model satisfies a predetermined constraint relationship between the abnormality condition and the physiological parameter.

Consistent with the present disclosure, the system and method disclosed herein may jointly predict an abnormality of an anatomical structure (e.g., a vessel abnormality such as a vessel lesion) and a functional physiological parameter of the anatomical structure by utilizing a joint learning model based on the medical image. By the application of the joint learning model, the system and method disclosed herein can significantly improve a consistency between a prediction result of the abnormality of the anatomical structure and a prediction result of the physiological parameter of the anatomical structure.

The foregoing general description and the following detailed description are only exemplary and illustrative, and do not intend to limit the claimed invention.

BRIEF DESCRIPTION OF THE DRAWINGS

In the drawings, which are not necessarily drawn to scale, like reference numerals may describe similar components in different views. Like reference numerals having letter suffixes or different letter suffixes may represent different instances of similar components. The drawings illustrate generally, by way of example, but not by way of limitation, various embodiments, and together with the description and claims, serve to explain the disclosed embodiments. Such embodiments are demonstrative and not intended to be exhaustive or exclusive embodiments of the present method, device, system, or non-transitory computer readable medium having instructions thereon for implementing the method.

DETAILED DESCRIPTION

Reference will be made in detail to the exemplary embodiments herein, examples of which are illustrated in the accompanying drawings.

In the present disclosure, an anatomical structure may include a vessel or any other suitable anatomical structure. Without loss of generality, the description below will be provided by taking a vessel (such as a coronary artery) as an example of the anatomical structure, and the description is also applicable to any other anatomical structure.

Consistent with the present disclosure, an abnormality condition of a vessel may indicate a condition different from a normal tissue structure of the vessel such as an abnormal condition of the vessel. For example, an abnormality condition of the vessel may indicate a condition related to a lesion or sub-health status of the vessel, including but not limited to at least one of the following: vascular plaque, myocardial bridge, aneurysm, or the like generated in the anatomical structure of the vessel. In another example, the abnormal condition of the vessel may also indicate that foreign or external matters are introduced into blood vessel tissues, such as but not limited to at least one of stents, catheters, or wires.

Figure 1A:
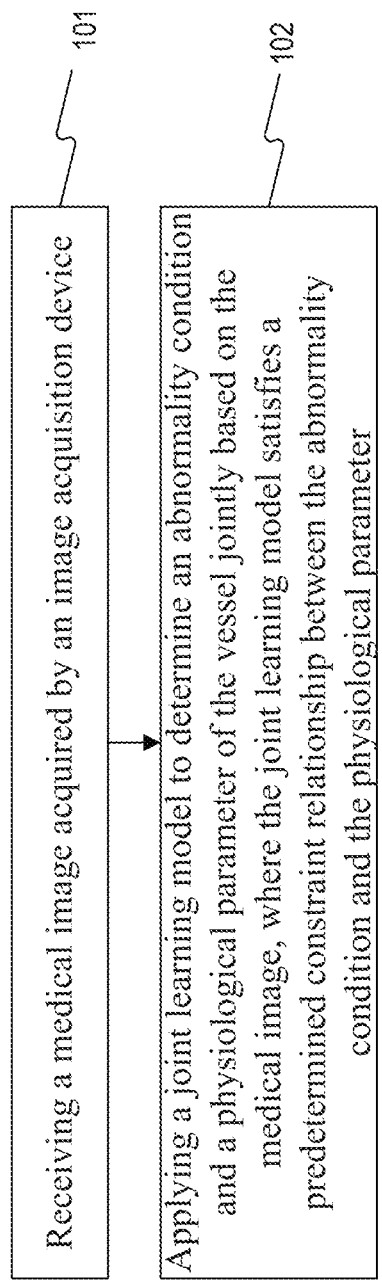
FIG. 1A illustrates a flowchart of an exemplary method for joint abnormality detection and physiological condition estimation, according to an embodiment of the present disclosure.

FIG. 1A illustrates a flowchart of an exemplary method for joint abnormality detection and physiological condition estimation, according to an embodiment of the present disclosure. As shown in FIG. 1A, the method may start from step 101, receiving a medical image acquired by an image acquisition device. The medical image may include a vessel. For example, the medical image may include an image generated by one of the various imaging modalities which include but not limited to Computed Tomography (CT), Magnetic Resonance Imaging (MRI), ultrasonic imaging, Optical Coherence Tomography (OCT), and so on.

In step 102, a joint learning model can be applied to determine an abnormality condition and a physiological parameter of the vessel based on the medical image. The joint learning model satisfies a predetermined constraint relationship between the abnormality condition and the physiological parameter.

For example, a joint learning model can be constructed for two tasks including vessel abnormality detection and vessel physiological parameter prediction, so that the joint learning model may be used not only for vessel abnormality detection but also for physiological parameter estimation. The joint learning model may detect a vessel abnormality and predict a physiological parameter from the medical image together. The joint learning model may adopt a multi-task learning framework, or serial models, or a learning framework by fusing the two tasks.

The joint learning model may be trained using a joint training by utilizing multiply data sets with annotations, so as to reduce an over-fitting associated with each single task significantly and learn a better representation for both tasks. Thus, the trained joint learning model can generalize better to process new test data with a better performance. Furthermore, through the joint training, a task that can learn certain useful features can provide instructions to another task that has difficulty in capturing these features, so that the other task can learn these features better. This leads to several advantages over traditional methods. First, when a model is trained only for lesion detection or FFR prediction, it may bear the risk of overfitting the noise on the single task. On the other hand, if the model is trained for both tasks, the model learns a better representation by not overfitting the noise of a single task. As a result, the trained model can generalize better to process new test data. Second, training a model on a single task may result in a failure of capturing certain features. It might be because this task interacts with these features in a complex way. By training a joint model, an additional task that learns these features much easier can guide this task to better learn these features. Thirdly, as will be demonstrated later, the joint learning model disclosed herein can be designed explicitly to generate consistent lesion and FFR predictions. Other advantages are also possible.

In addition, the joint learning model can be trained with full labels, partial labels, or even unlabeled data, thus making sufficient utilization of various data annotations. Taking a physiological parameter as an example, a full label example for the physiological parameter includes a pullback curve indicating the physiological parameter at each position along a path. Physiological parameter labels may also be generated using other approaches. A partial label example for the physiological parameter may include one or more physiological parameter values measured at one or more positions. An unlabeled example for the physiological parameter may be a healthy vessel absent of lesions, which can be considered as normal, while a vessel with severe stenosis (for example, larger than 90% occlusion) can be regarded as a functional significant vessel. Taking a lesion as an example of an abnormality, a label for the lesion may include, but not limited to, the following: an annotated lesion position, a bounding box, starting and ending points, a lesion type (calcified/non-calcified/mixed, or vulnerable/stable lesion, etc.), lesion severity (an area reduction ratio, a diameter reduction ratio, etc.), etc.

In step 102, the predetermined constraint relationship between the abnormal condition of and the physiological parameter may be embedded in various manners. For example, the predetermined constraint relationship between the abnormality condition and the physiological parameter can be modeled (or built) in a model structure of the joint learning model in an explicit manner, so as to forcibly avoid any potential conflict between the abnormal detection result and the prediction result of the physiological parameter from the model. For another example, in the training process of the joint learning model, a divergence with respect to the predetermined constraint relationship between the abnormality condition of and the physiological parameter may be penalized using a loss function, so that the joint learning model may learn a better representation which may reduce or even eliminate the divergence (or conflict).

Figure 1B:
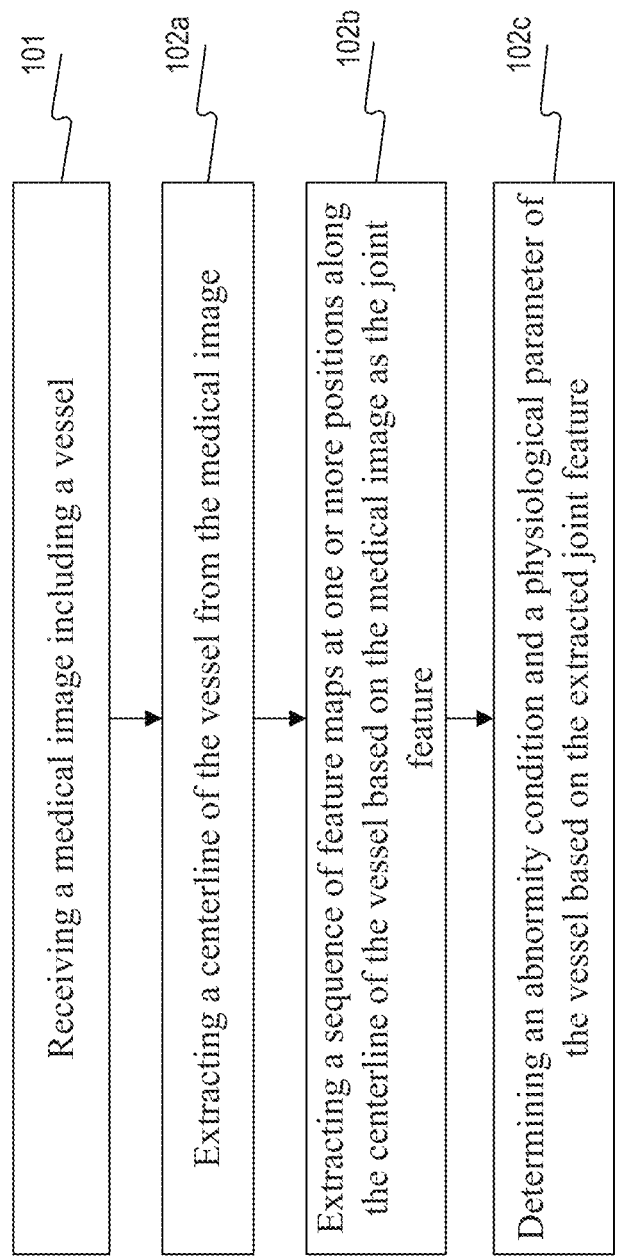
FIG. 1B illustrates a flowchart of another exemplary method for joint abnormality detection and physiological condition estimation, according to an embodiment of the present disclosure.

FIG. 1B illustrates a flowchart of another exemplary method for joint abnormality detection and physiological condition estimation, according to an embodiment of the present disclosure. As shown in FIG. 1B, the method starts from step 101 by receiving a medical image including a vessel. In step 102a, a centerline of the vessel may be extracted from the medical image.

In step 102b, a sequence of feature maps at one or more positions along the centerline of the vessel may be extracted based on the medical image as a joint feature. For example, the sequence of feature maps may include one or more features at the one or more positions along the centerline of the vessel. The feature maps might be generated by external models or given as inputs. The feature maps can also learned directly in the joint learning model. A corresponding feature at each position may include at least one of a hand-crafted feature, a raw image, an automatically learned feature, or a vessel mask, etc. For example, a feature at a position may be a hand-crafted feature or an automatic learned feature extracted from a cardiac image or a coronary mask.

In step 102c, an abnormality condition of the vessel and a physiological parameter of the vessel may be determined based on the extracted joint feature. In some embodiments, the abnormality condition of the vessel may include at least one of an abnormality mask, an abnormality representative coordinate (for example, a center coordinate of the abnormality), an abnormality type, an abnormality position, and an abnormality size/severity at one or more positions along the centerline of the vessel. The physiological parameter of the vessel may include at least one of a vessel functional parameter that is out of physiological functional status, a blood pressure, a blood velocity, a blood flow-rate, a wall-surface shear stress, a fractional flow reserve (FFR) parameter, an index of microcirculation resistance (IMR), an instantaneous wave-free ratio (iFR) parameter, a relative FFR change parameter or a relative iFR change parameter compared with an adjacent position at one or more positions along the centerline of the vessel.

Hereinafter, the method for joint abnormality detection and physiological condition estimation according to the present disclosure will be described in details by taking a coronary CT image as an example of the medical image, a vessel lesion as an example of the abnormality condition of the vessel, and FFR as an example of the physiological parameter. It should be noted that the present disclosure is not limited to this, and can also be extended to other situations.

In some embodiments, the abnormality condition may include a condition related to at least one of vessel plaque, myocardial bridge, aneurysm, stent, catheter, or guide wire. In some embodiments, besides FFR, the physiological parameter of the vessel (also referred to as vessel functional parameter) also includes at least one of a physiological functional status, a blood pressure, a blood velocity, a blood flow-rate, a wall-surface shear stress, an index of microcirculation resistance (IMR), an instantaneous wave-free ratio (iFR), a relative FFR change parameter or a relative iFR change parameter compared with an adjacent position at one or more positions along the centerline of the vessel.

Figure 2:
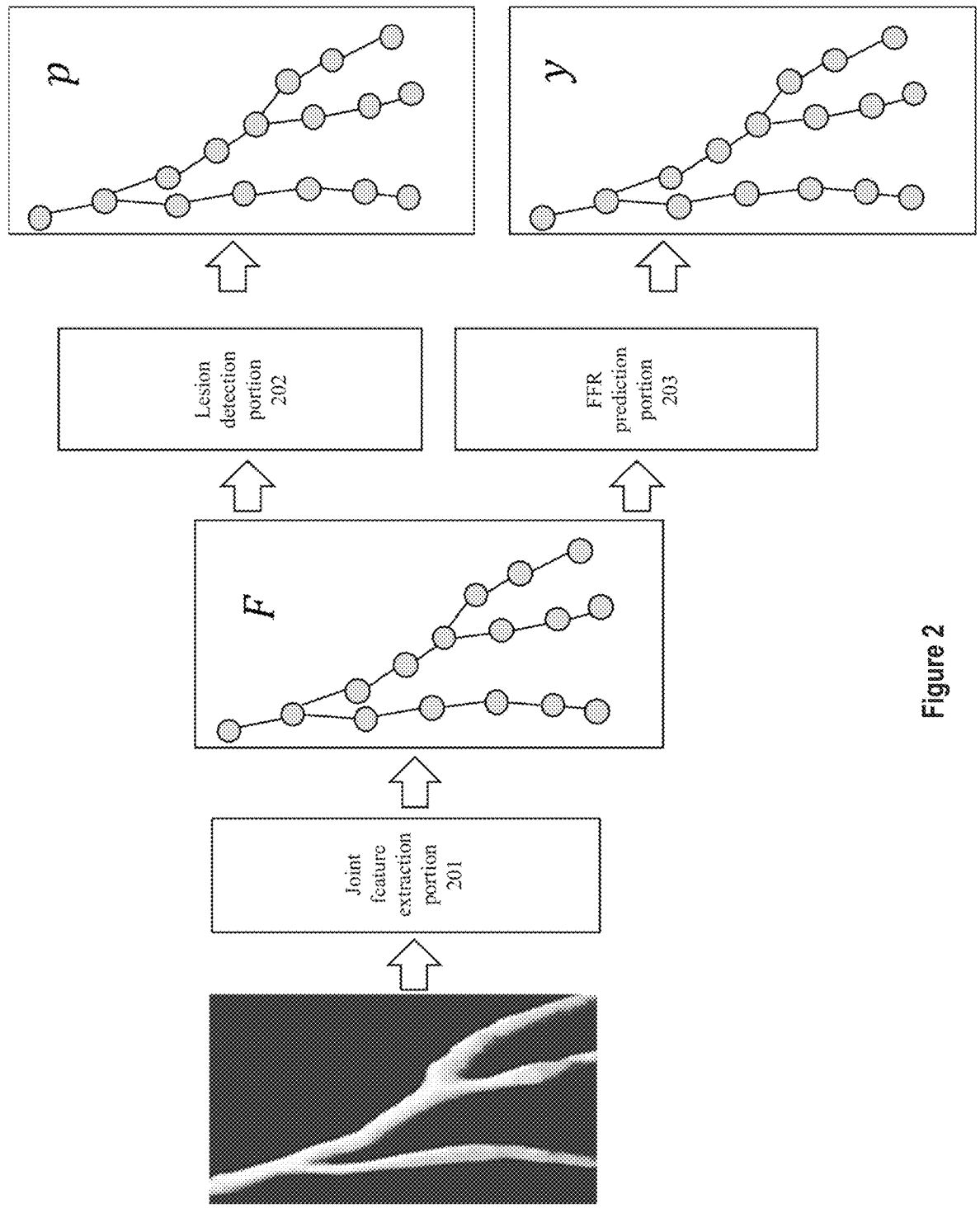
FIG. 2 illustrates a schematic diagram of an exemplary structure of a joint learning model for joint lesion detection and physiological parameter prediction, according to an embodiment of the present disclosure.

FIG. 2 illustrates a schematic diagram of an exemplary structure of a joint learning model for abnormality detection (e.g., lesion detection) and physiological condition estimation (e.g., physiological parameter prediction), according to an embodiment of the present disclosure. As shown in FIG. 2, the joint learning model may include a joint feature extraction portion 201, a lesion detection portion 202 (as an example of an abnormality detection portion), and an FFR prediction portion 203 (as an example of a physiological parameter prediction portion).

The joint feature extraction portion 201 is configured to extract a joint feature based on the medical image. For example, the joint feature may include a sequence of features F along the centerline of the vessel. In some embodiments, the joint feature can be directly derived from a raw medical image, a transformed medical image, or a processed medical image (e.g., a mask, an image acquired by different intensity conversion, etc.). The joint feature may be hand-crafted or automatically learned by a model such as a neural network. In the latter case, the joint feature extraction portion 201 can be trained in a training phase. The extracted joint feature may be used for both lesion detection and physiological parameter prediction. The joint learning model can leverage a correlation between the two tasks of lesion detection and physiological parameter prediction sufficiently by sharing the joint feature extraction portion 201.

The joint feature extraction portion 201 may use different manners to extract the joint feature with respect to different medical images.

For example, when receiving a sequence of initial feature information at one or more positions along the centerline of the vessel as an input, the joint feature extraction 201 extracts a feature map for initial feature information at each of one or more positions respectively. In this manner, a sequence of feature maps at one or more positions along the centerline of the vessel may be obtained as the joint feature, where the sequence of feature maps may include one or more features maps for the one or more positions, respectively. In some embodiments, initial feature information at each position may include at least one of a 2D or 3D image patch extracted at the position, a vessel mask, a hand-crafted initial feature, a semi-automatically extracted initial feature, or an automatically extracted initial feature. For example, a CNN unit can be applied to each position to extract the corresponding feature map, and the parameter(s) of each CNN unit could be optimized together through back propagation during the training.

In another example, when receiving a medical image (for example, a 2D/3D whole slide) including a vessel as an input, a convolution operation can be performed at an area around each position along the centerline of the vessel to obtain a feature map at each position. As a result, a sequence of feature maps can be obtained at the one or more positions along the centerline of the vessel as the joint feature.

In some embodiments, the joint learning of the joint feature may use one or more positions along the centerline of the vessel. However, the one or more positions may not be limited to centerline points. In some embodiments, the positions can be selected from an adjacent region including a lateral region, a longitudinal region, perturbated centerline points, or a vessel mask, etc. For convenience of description, the description herein may take a centerline point as an example for a position, but the description herein can be flexibly extended to any other type of positions without loss of generality.

The joint feature extracted by the joint feature extraction portion 201 is used commonly as a shared input for both lesion detection portion 202 and FFR prediction portion 203. Then, the lesion detection portion 203 may determine a lesion detection result p based on the extracted joint feature, and the FFR prediction portion 203 may determine a FFR prediction result y based on the extracted joint feature. In some embodiments, the lesion detection result p may include at least one of the following: a lesion mask (yes/no at each centerline point), lesion center coordinates, a lesion size, a lesion position, a bounding box, starting and ending points, a lesion severity, a lesion type (calcified/non-calcified/mixed, or vulnerable/stable lesion, etc.). The FFR prediction result y may include an FFR value at each centerline point or at partial centerline points, a relative FFR change compared with an adjacent point, and so on.

In some embodiments, the lesion detection portion 202 and the FFR prediction portion 203 may be implemented by at least one of a CNN, an MLP (Multilayer Perceptron), an FCN (fully-connected neural network), a RNN (Recurrent Neural Network), a GCN (Graph Convolutional Network), etc.

In some embodiments, the joint learning model can be trained using a joint training based on a data set with abnormality annotations together with a data set with physiological parameter annotations with an application of a loss function, where the loss function penalizes a divergence with respect to the predetermined constraint relationship between the abnormality condition and the physiological parameter. Alternatively or additionally, the joint learning model may be configured to model the predetermined constraint relationship between the abnormality condition and the physiological parameter of the vessel into its model structure, so as to eliminate or reduce the divergence with respect to the predetermined constraint relationship between the abnormality condition and the physiological parameter.

Taking the lesion severity and the FFR value at each position of the vessel as examples of the abnormal condition and the physiological parameter respectively, the predetermined constraint relationship between the lesion condition and the FFR value can be embedded through the framework of the joint learning model and/or the incorporation of the loss function used in the joint training. The predetermined constraint relationship may indicate that the FFR value changes in accordance with the lesion severity, while the FFR value does not change or changes slowly at the non-lesion position. In this manner, the lesion detection result and the FFR prediction result obtained by the trained joint learning model can comply with the physiological mechanism between them, which is physiologically consistent and may significantly improves the accuracy and robustness of the lesion detection result and the FFR prediction result.

Figure 3:
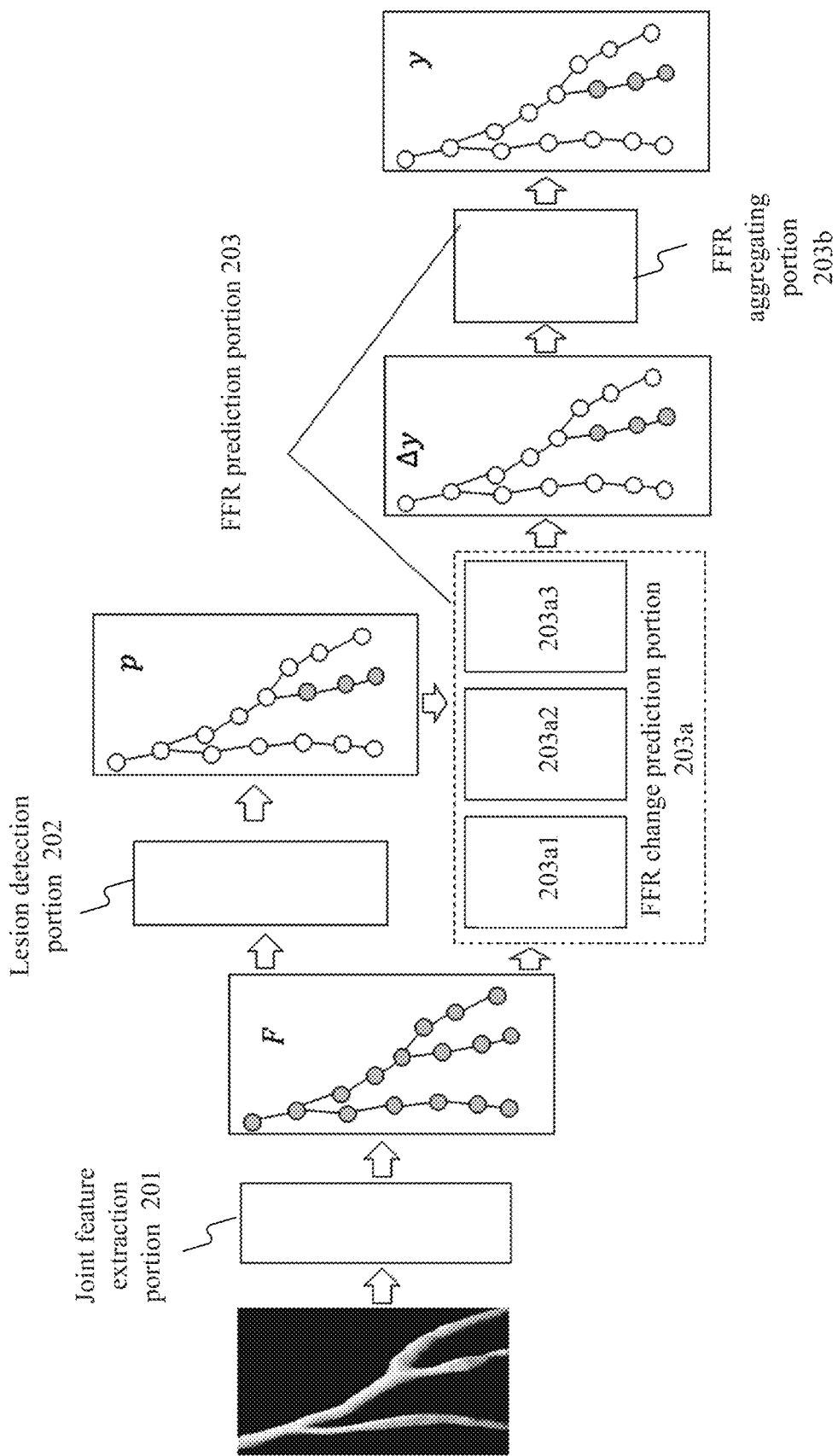
FIG. 3 illustrates a schematic diagram of another exemplary structure of a joint learning model for lesion detection and physiological parameter prediction, according to an embodiment of the present disclosure.

FIG. 3 illustrates schematic diagram of another exemplary structure of the joint learning model for the lesion detection and the physiological parameter prediction, according to an embodiment of the present disclosure. As shown in FIG. 3, the lesion detection portion 202 may be configured to detect, for each position along the centerline of the vessel, whether the position is abnormal (e.g., whether abnormality occurs at the position). The FFR prediction portion 203 may be configured to predict, for each position, a change value $\Delta FFR$ of the FFR at the position compared with its upstream adjacent position via the FFR change prediction portion 203a, and aggregate change values $\Delta FFRs$ at its upstream positions via a FFR aggregating portion 203b, so as to determine the FFR at the position. For example, a change value $\Delta FFR$ at a position may be a FFR drop value compared with an upstream adjacent position, and $\Delta FFR$ may also be used to denote the FFR drop value as described below.

In some embodiments, the predetermined constraint relationship between the FFR change and the lesion of the vessel may be forcibly embedded in the procedure of predicting the change value by the FFR change prediction portion 203a and/or in the structure of the FFR change prediction portion 203a.

Specifically, based on the joint feature, an initial drop value of FFR ($\Delta FFRi$) at each position compared with its upstream adjacent position may be predicted by an initial prediction sub-portion 203a1.

A first adjustment may be performed on the initial drop value $\Delta FFRi$ by a first adjustment sub-portion 203a2 to obtain an intermediate drop value $\overline{\Delta FFR}$, so that the intermediate drop vale $\overline{\Delta FFR}$ may fall within a predetermined range of the FFR drop value $\Delta FFR$. For example, the first adjustment sub-portion 203a2 may perform a process on the initial FFR drop value $\Delta FFRi$ by using, for example, a Rectifying Linear Unit (RELU), which keeps a positive value while mapping a negative value to zero given an input, as shown in the following equation (1). As a result, the intermediate FFR drop value $\overline{\Delta FFR}$ has a non-negative value (e.g., 0 or a positive value), which is consistent with a prior knowledge that FFR value drops from upstream to downstream of the vessel. Thus, unreasonable FFR drop value $\Delta FFR$ is avoided without conflicting with the prior knowledge.

$$\overline{\Delta FFR} = \begin{cases} \Delta FFRi, & \text{in case of } \Delta FFRi \geq 0 \\ 0, & \text{in case of } \Delta FFRi < 0 \end{cases} \quad \text{equation (1)}$$

Next, a second adjustment may be performed on the intermediate FFR drop value $\overline{\Delta FFR}$ obtained from the first adjustment by a second adjustment sub-portion 203a3 based on a lesion occurrence position to obtain an FFR drop value $\Delta FFR$, so that the predetermined constraint relationship is valid between the lesion occurrence position and the FFR drop value $\Delta FFR$ obtained from the second adjustment. Taking FFR as an example of the vessel functional parameter herein, the predetermined constraint relationship may indicate that: the FFR value changes in accordance with the degree of the lesion, while it does not change or change slowly at a non-lesion position. For example, according to the following equation (2), the FFR drop value $\Delta FFR$ at a non-lesion position compared with its upstream adjacent position may be set to zero or a small number (e.g., a number smaller than or equal to a predetermined threshold).

$$\Delta FFR = \begin{cases} \overline{\Delta FFR}, & \text{in case that the position is predicted as lesion} \\ 0, & \text{in case that the postion is not predicted as lesion} \end{cases} \quad \text{equation (2)}$$

As shown in FIG. 3, a gray circle indicates a centerline point with a lesion and thus with a positive ΔFFR is determined, while the white circle indicates a non-lesion (i.e., normal) centerline point with a zero value. Through the joint action of the first adjustment sub-portion 203a2 and the second adjustment sub-portion 203a3, the predicted FFR drop value ΔFFR at each centerline point may only be non-zero (indeed positive) at a centerline point predicted as a lesion point, while the FFR drop value ΔFFR at other centerline points (i.e., at normal positions) might be set to zero (or small values). As a result, the FFR drop value ΔFFR after two adjustments not only satisfies the prior knowledge that FFR generally does not increase along a vessel path from upstream to downstream, but also satisfies the prior knowledge that FFR changing is mainly due to lesion. Once the FFR drop value ΔFFR is obtained, the final FFR value $FFR_t$ at the t-th centerline point may be generated by a FFR aggregating portion 203b. For example, the FFR value $FFR_t$ may be obtained according to the following equation (3):

$$FFR_t = FFR_0 + \Sigma_{j \in \cup_t} \Delta FFR_j \quad \text{equation (3)}$$

Here, $FFR_t$ indicates a final FFR value at the t-th centerline point, $FFR_0$ indicates an initial value near aorta, $\cup_t$ indicates a collection of all upstream centerline points of the t-th centerline point, and $\Delta FFR_j$ indicates the FFR change value (e.g., FFR drop value) predicted for the j-th centerline point. Because these operations are differentiable, the whole joint learning model may perform learning from end-to-end.

Figure 4:
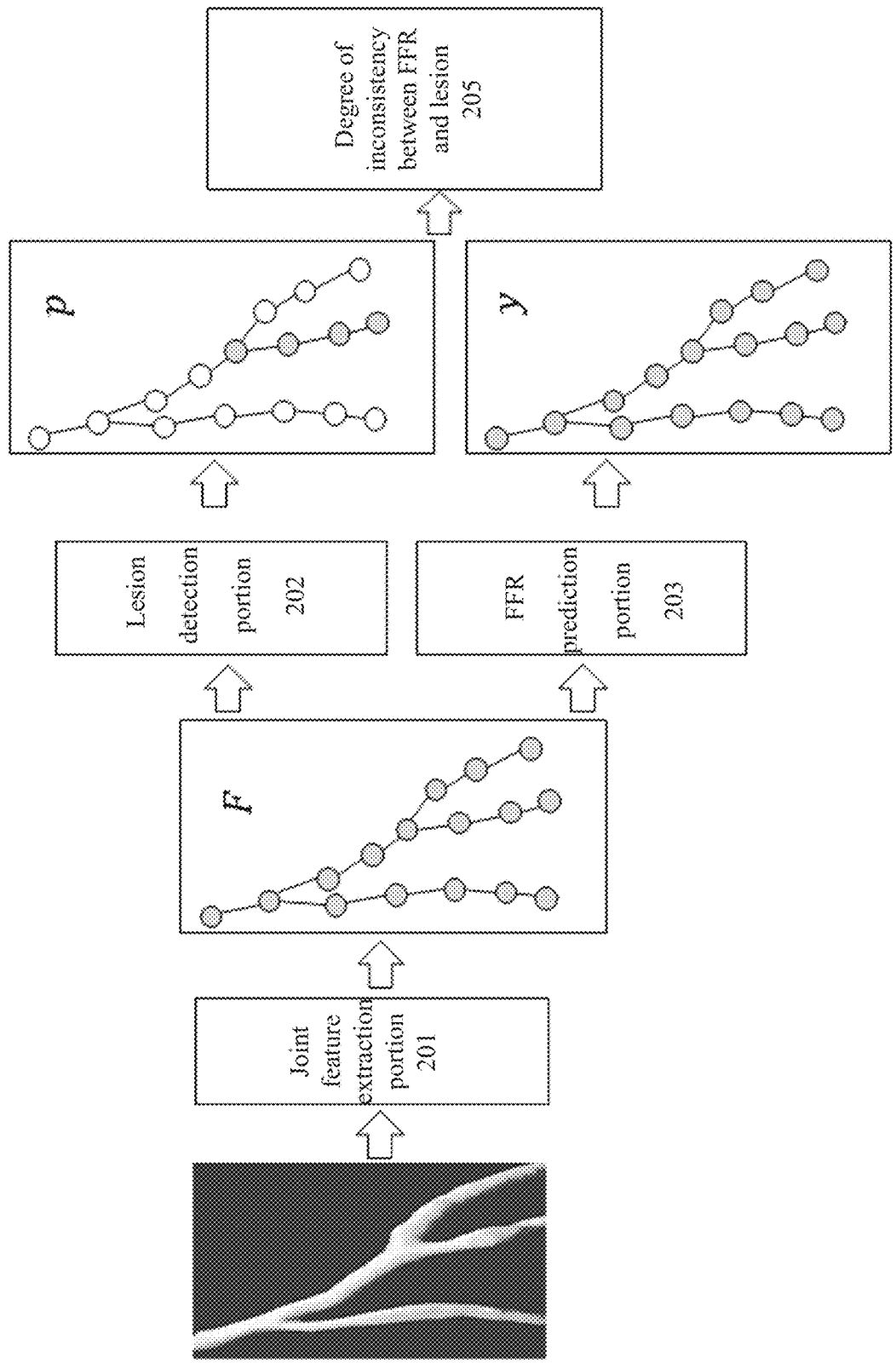
FIG. 4 illustrates a schematic diagram of a divergence loss term in a loss function for training a joint learning model, according to an embodiment of the present disclosure.

In some embodiments, the loss function used by the joint training may include a divergence loss term, where the divergence loss term indicates a divergence degree between the detection result of the lesion and the prediction result of the physiological parameter. As shown in FIG. 4, for the vessel lesion and the FFR value, the divergence loss term may include a degree of inconsistency 205 between the distribution of FFR and the distribution of lesion. The higher the degree of inconsistency is, the higher the penalization may be. The gray circle indicates that the corresponding centerline point belongs to the lesion area while the white circle indicates that the corresponding centerline point belongs to the non-lesion area. For each position in the non-lesion area, such as the center line point corresponding to the white circle shown in FIG. 4, an absolute value of the FFR change value ΔFFR at a current position compared with an upstream adjacent position may be accumulated. The larger the cumulative value is, the higher the inconsistency between the distribution of FFR and the distribution of lesion may be, and thus the larger the value of the loss function may be. As a result, the joint learning model is made to perform a training towards reducing the loss function (including the degree of inconsistency) by adjusting model parameters based on the same. Therefore, the joint learning model is able to learn a better representation that can reduce or even eliminate the inconsistency (confliction). The predetermined constraint relationship may indicate that the FFR value changes in accordance with the lesion severity. In some embodiments, the divergence degree may also be associated with the lesion severity in the lesion region so that points or locations with larger lesion severity have less penalty but points or locations with lower lesion severity have higher penalty.

Figure 5:
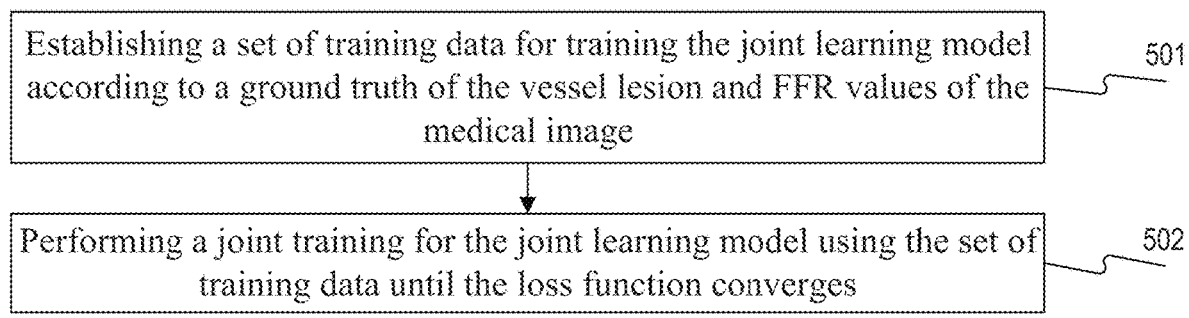
FIG. 5 illustrates a flowchart of a training procedure of a joint learning model, according to an embodiment of the present disclosure.

FIG. 5 illustrates a flowchart of a training procedure of the joint learning model, according to an embodiment of the present disclosure. As shown in FIG. 5, in step 501, a set of training data for training the joint learning model may be established according to the ground truth of the vessel lesion and FFR values of the medical image. The training data set may include data with full labels, partial labels, or even unlabeled data, so that data with various labels can be fully utilized in the training.

In step 502, jointly training may be performed on the joint training model by using the set of training data until the loss function converges. Specifically, an end-to-end training may be performed by using optimization methods such as stochastic gradient descent method (SGD), RMSProp or Adam. For example, the loss function may be expressed by equation (4):

$$\ell = \ell_d + \lambda_c \ell_y + \lambda_{in} \ell_{in} \quad \text{equation (4)}$$

Herein, $\ell d$ indicates a lesion detection loss, $\ell y$ indicates an FFR regression loss, $\lambda c$ indicates a weight of the FFR regression loss, $\ell$ in indicates an additional consistency loss forced between FFR and lesion prediction, and $\lambda_{in}$ is a weight of the consistency loss. For example, an FFR drop value at a non-lesion centerline point may be forced to be zero. For example, $\ell_{in}$ may be expressed by equation (5):

$$\ell_{in} = \Sigma_{j \in C} |\Delta FFR_j| \quad \text{equation (5)}$$

Herein, C is a set of centerline points predicted as belonging to a non-lesion area, $\Delta FFR_j$ is a FFR drop value at the j-th centerline point compared to its upstream centerline point. According to a prior knowledge of physiological formation mechanism of FFR, in the non-lesion area an FFR drop value is zero or is almost zero (small values approximately to be zero) between adjacent centerline points. By penalizing the accumulation of the absolute values of FFR drops in the non-lesion area, it guides the joint learning model to learn the model parameters that are more consistent with the prior knowledge.

Figure 6:
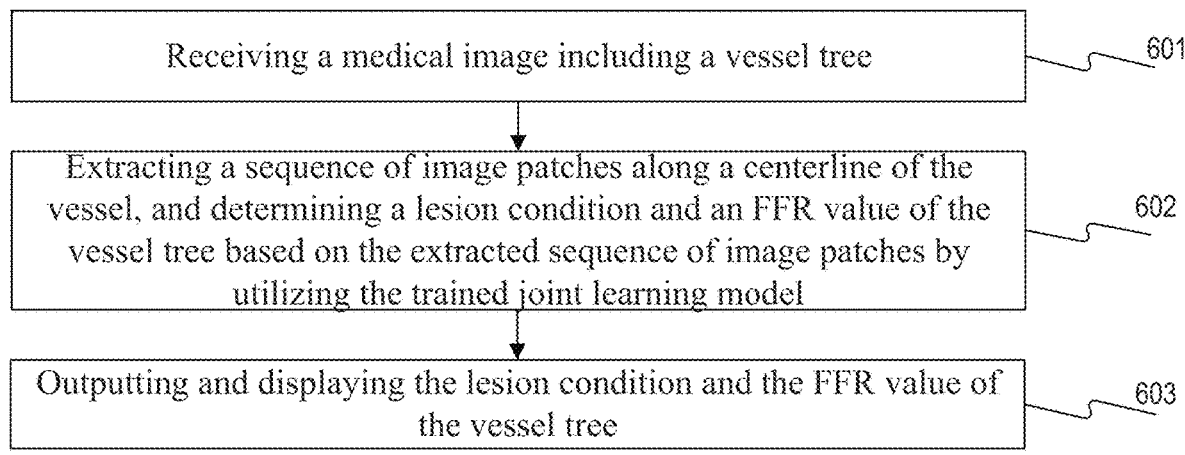
FIG. 6 illustrates a flowchart of an analysis procedure of lesion detection for a medical image including a vessel tree together with physiological parameter prediction, according to an embodiment of the present disclosure.

FIG. 6 illustrates a flowchart of an analysis procedure for lesion detection together with physiological parameter prediction for a medical image including a vessel tree, according to an embodiment of the present disclosure. As shown in FIG. 6, in step 601, a medical image including a vessel tree may be received and a centerline of the vessel tree may be extracted. In step 602, a sequence of image patches may be extracted along the centerline, and a lesion condition and an FFR value of the vessel tree (especially for candidate stenosis locations) may be determined based on the extracted sequence of image patches by utilizing the trained joint learning model. In step 603, the lesion condition and the FFR value of the vessel tree may be output and displayed.

In some embodiments, during the joint training, the physiological functional status at downstream or branches of the vessel lesion may be estimated in advance. The physiological functional status may be continuous variables, or may be binary (e.g., 0 for normal and 1 for abnormal), or may be at different levels (such as level I, level II, level III, level IV, etc.). If there are no lesion locations (e.g., no lesion points) at upstream or branches of the vessel, the prediction result of the physiological functional status of the vessel may be normal. On the other hand, if there are lesion locations (e.g., lesion points) at upstream or branches of the vessel, the prediction result of the physiological functional status of the vessel may be abnormal. With respect to the inconsistency between the physiological functional status and lesion locations, penalty may be adopted through a penalty function, or adjustment may be adopted by logic processing.

Figure 7:
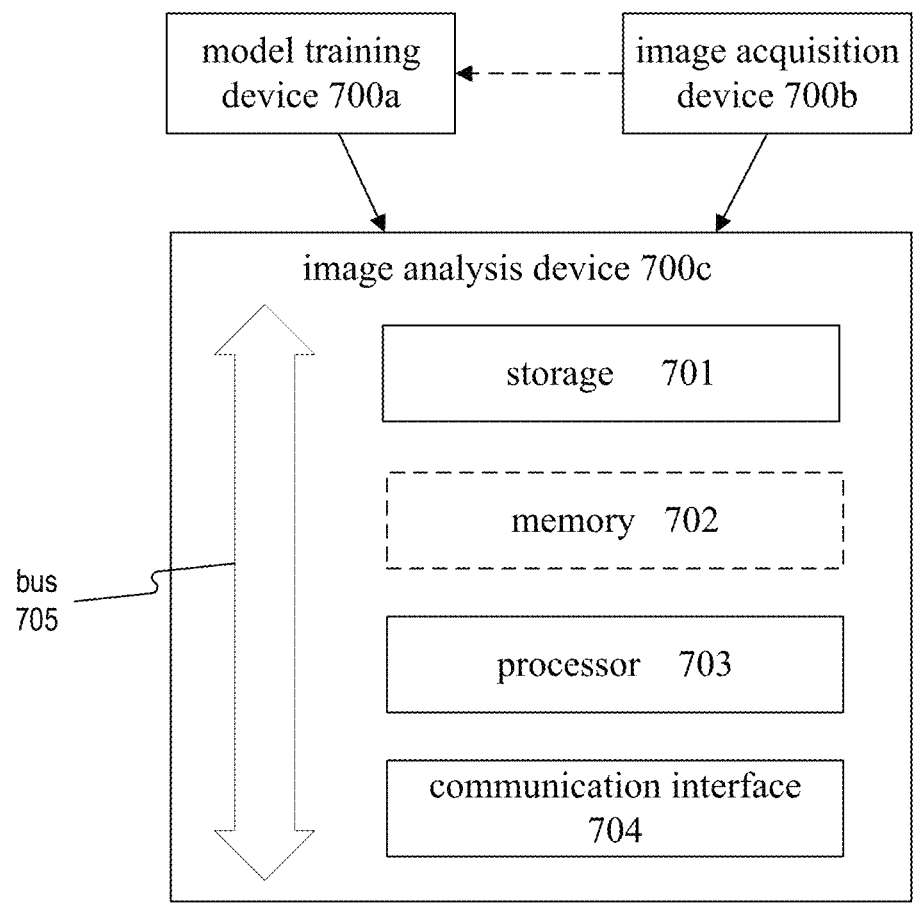
FIG. 7 illustrates a schematic block diagram of a system for joint abnormality detection and physiological condition estimation, according to an embodiment of the present disclosure.

FIG. 7 illustrates a schematic block diagram of a system for joint abnormality detection and physiological condition estimation, according to an embodiment of the present disclosure. As shown in FIG. 7, the analysis system may include a model training device 700a, an image acquisition device 700b, and an image analysis device 700c.

In some embodiments, the image analysis device 700c may be a dedicated computer or a general-purpose computer. For example, the image analysis device 700c may be a computer customized for a hospital to perform image acquisition and image processing tasks, or it may also be a server in the cloud.

The image analysis device 700c may include at least one processor 703 configured to perform the functions described herein. For example, the at least one processor 703 may be configured to perform the methods disclosed herein.

In some embodiments, the processor 703 may be a processing device including one or more general processing devices, such as a microprocessor, a central processing unit (CPU), a graphics processing unit (GPU) and so on. More specifically, the processor 703 may be a complex instruction set computing (CISC) microprocessor, a reduced instruction set computing (RISC) microprocessor, a very long instruction word (VLIW) microprocessor, a processor running other instruction sets or a combination of instruction sets. The processor 703 may also be one or more dedicated processing devices, such as an application specific integrated circuit (ASIC), a field programmable gate array (FPGA), a digital signal processor (DSP), a system on chip (SoC) and so on.

The image analysis device 700c may further include a storage 701, which may be configured to load or store the trained joint learning model or an image processing/analysis program according to embodiments of the present disclosure. The image analysis program, when implemented by the processor 703, may perform the methods disclosed herein.

The storage 701 may be a non-transitory computer readable medium such as a read only memory (ROM), random access memory (RAM), phase change random access memory (PRAM), static random access memory (SRAM), dynamic random access memory (DRAM), electrically erasable programmable read only memory (EEPROM), other types of random access memory (RAM), flash memory or other forms of flash memory, cache, register, static memory, compact disk read-only memory (CD-ROM), digital versatile disk (DVD) or other optical memory, cassette tape or other magnetic storage devices, or any other possible non-transitory medium for storing information or instructions accessible by computer devices and the like. When implemented by the processor 703, the instructions stored on the storage 701 can perform the methods disclosed herein.

Although the model training device 700a and the image analysis device 700c are shown as independent devices in FIG. 7, in some embodiments, the image analysis device 700c may also perform a model training function, and therefore, the storage 701 may be configured to load a set of training data labeled with the abnormality condition and the physiological parameter of the vessel, and the processor 703 may be configured to jointly train the joint learning model based on the loaded set of training data. For example, the processor 703 may be configured to jointly train the joint feature extraction portion, the abnormality detection portion, and the physiological parameter prediction portion thereof.

In some embodiments, the image analysis device 700c may further include a memory 702 configured to load the joint learning model according to embodiments of the present disclosure from the storage 701, or temporarily store intermediate data generated in the processing/analysis procedure by using the joint learning model. The processor 703 may be communicatively attached to the memory 702 and configured to execute executable instructions stored thereon to execute the methods disclosed herein.

In some embodiments, the memory 702 may store intermediate information generated in the training phase or the prediction phase, such as feature information, an abnormal condition and/or a physiological parameter of the vessel, each loss term value, or the like generated while executing a computer program. In some embodiments, the memory 702 may store computer-executable instructions, such as one or more image processing programs. In some embodiments, the joint learning model, each portion and each sub-portion of the joint learning model can be implemented as applications stored in the storage 701, and these applications may be loaded into the memory 702, and then executed by the processor 703 to achieve the corresponding functionality.

In some embodiments, the memory 702 may be a non-transitory computer readable medium for storing information or instruction that can be accessed and executed by computer equipment and the like, such as read only memory (ROM), random access memory (RAM), phase change random access memory (PRAM), static random access memory (SRAM), dynamic random access memory (DRAM), electrically erasable programmable read only memory (EEPROM), other types of random access memory (RAM), flash disks or other forms of flash memory, cache, register, static memory or any other possible medium.

In some embodiments, the image analysis device 700c may further include a communication interface 704 used for receiving the medical image acquired by the image acquisition device 700b. In some embodiments, the communication interface 704 may include any one of a network adapter, cable connector, serial connector, USB connector, parallel connector, high-speed data transmission adapter (such as optical fiber, USB 3.0, Thunderbolt interface, etc.), wireless network adapter (such as WiFi adapter), a telecommunication (such as 3G, 4G/LTE, 5G, etc.) adapter and so on.

The image analysis device 700c may be connected to the model training device 700a, the image acquisition device 700b and other components via the communication interface 704. In some embodiments, the communication interface 704 may be configured to receive the trained joint learning model from the model training device 700, and may also be configured to receive the medical image including a vessel from the image acquisition device 700b.

Specifically, the image acquisition device 700b may include any one of a general CT, general MRI, functional magnetic resonance imaging (such as fMRI, DCE-MRI and diffusion MRI), cone-beam computed tomography (CBCT), positron emission tomography (PET), single photon emission computed tomography (SPECT), X-ray imaging, optical tomography (OCT), fluorescence imaging, ultrasound imaging and radiation field imaging and the like.

In some embodiments, the model training device 700a may be configured to train a joint learning model, and send the trained joint learning model to the image analysis device 700c, so as to determine the abnormal condition and physiological parameter of the vessel based on the medical image including the vessel by using the trained joint learning model. In some embodiments, the model training device 700a and the image analysis device 700c may be implemented by a single computer or processor.

In some embodiments, the model training device 700a may be implemented using hardware specially programmed by software that performs a training processing. For example, the model training device 700a may include a processor and a non-transitory computer readable medium similar to those of the image analysis device 700c. The processor implements the training by executing the executable instructions of the training process stored in the computer readable medium. The model training device 700a may also include input and output interfaces to communicate with a training database, network, and/or user interface. The user interface is used to select the set of training data, adjust one or more parameters in the training process, select or modify a framework of the joint learning model.

Another aspect of the present disclosure is to provide a non-transitory computer readable medium storing instruction thereon, and when implemented, it causes one or more processors to perform the methods disclosed herein. The computer-readable medium may include volatile or nonvolatile, magnetic, semiconductor-based, tape-based, optical, removable, non-removable or other types of computer-readable media or computer-readable storage devices. For example, the computer-readable medium may be a storage device or a storage module in which a computer instruction is stored, as disclosed. In some embodiments, the computer-readable medium may be a magnetic disk or a flash drive on which computer instructions are stored.

Various modifications and changes can be made to the method, device and system of the present disclosure. Other embodiments can be derived by those skilled in the art in view of the description and practice of the disclosed system and the related method. Each claim of the present disclosure can be understood as an independent embodiment, and any combination between them is also used as an embodiment of the present disclosure, and these embodiments are deemed to be included in the present disclosure.

The description and examples are intended to be exemplary only, and the true scope is indicated by the appended claims and their equivalents.

What is claimed is:

1. A method for joint abnormality detection and physiological condition estimation from a medical image, comprising:
   receiving, by at least one processor, the medical image acquired by an image acquisition device, wherein the medical image comprises an anatomical structure; and
   applying, by the at least one processor, a joint learning model to determine an abnormality condition and a physiological parameter of the anatomical structure jointly based on the medical image, wherein the joint learning model satisfies a predetermined constraint relationship between the abnormality condition and the physiological parameter.

2. The method according to claim 1, wherein the joint learning model comprises:
   a joint feature extraction portion configured to extract a joint feature based on the medical image;
   an abnormality detection portion configured to determine the abnormality condition of the anatomical structure based on the extracted joint feature; and
   a physiological parameter prediction portion configured to determine the physiological parameter of the anatomical structure based on the extracted joint feature.

3. The method according to claim 1, wherein the joint learning model is trained using a joint training based on a data set with abnormality annotations and a data set with physiological parameter annotations, and wherein a loss function of the joint training penalizes a divergence with respect to the predetermined constraint relationship between the abnormality condition and the physiological parameter.

4. The method according to claim 1, wherein the predetermined constraint relationship between the abnormality condition and the physiological parameter is modelled into a model structure of the joint learning model to reduce the divergence with respect to the predetermined constraint relationship between the abnormality condition and the physiological parameter.

5. The method according to claim 2, wherein the anatomical structure comprises a vessel, the joint feature includes a sequence of features at one or more positions along a centerline of the vessel, and a corresponding feature at each position includes at least one of a hand-crafted feature, a raw image, an automatically learned feature, or a vessel mask,
   wherein the abnormality condition of the vessel includes at least one of an abnormality mask, an abnormality representative coordinate, an abnormality type, an abnormality position, or an abnormality size at the one or more positions along the centerline of the vessel, and
   wherein the physiological parameter of the vessel includes at least one of a vessel functional parameter that is out of physiological functional status, a blood pressure, a blood velocity, a blood flow-rate, a wall-surface shear stress, a fractional flow reserve (FFR) parameter, an index of microcirculation resistance index (IMR), an instantaneous wave-free ratio (iFR) parameter, a relative FFR change parameter or a relative iFR change parameter compared with an adjacent position at the one or more positions along the centerline of the vessel.

6. The method according to claim 3, wherein the anatomical structure comprises a vessel, wherein the loss function used by the joint training comprises a divergence loss term, and wherein the divergence loss term accumulates, for a position in a normal area of a centerline of the vessel, an absolute change value of a vessel functional parameter at the position compared with an upstream adjacent position.

7. The method according to claim 5, wherein the abnormality detection portion is configured to detect, for each position along the centerline of the vessel, whether abnormality occurs at the position,
   wherein the physiological parameter prediction portion is configured to: predict, for each position, a change value of the vessel functional parameter at the position compared with its upstream adjacent position, and aggregate change values at its upstream positions, so as to determine the vessel functional parameter at the position, and
   wherein to predict the change value of the vessel functional parameter at the position compared with its upstream adjacent position, the physiological parameter prediction portion is further configured to:
   predict an initial change value of the vessel functional parameter at the position compared with its upstream adjacent position based on the joint feature;
   perform a first adjustment on the initial change value to obtain an intermediate change value, so that the intermediate change value falls within a predetermined range of the vessel functional parameter; and
   perform a second adjustment on the intermediate change value obtained from the first adjustment based on an abnormality occurrence position to obtain the change value, so that the predetermined constraint relationship is valid between the abnormality occurrence position and the change value obtained from the second adjustment.

8. The method according to claim 7, wherein the vessel functional parameter comprises the FFR parameter, wherein the first adjustment sets a predicted negative change value to zero, and wherein the second adjustment sets a non-zero change value at a normal position to zero or a value smaller than a predetermined threshold.

9. The method according to claim 2, wherein the anatomical structure comprises a vessel, and wherein the joint feature extraction portion is further configured to extract the joint feature at least by:
  receiving a sequence of initial feature information at one or more positions along the centerline of the vessel as an input, and extracting a feature map for the initial feature information at each position respectively, so as to obtain a sequence of feature maps at the one or more positions along the centerline of the vessel as the joint feature, wherein initial feature information at each position includes at least one of an image patch extracted at the position, a vessel mask, a hand-crafted initial feature, a semi-automatically extracted initial feature, or an automatically extracted initial feature; or
  receiving the medical image including the vessel as an input, and acquiring a feature map at each position in the one or more positions along the centerline of the vessel for an area around the position, so as to obtain a sequence of feature maps at the one or more positions along the centerline of the vessel as the joint feature.

10. The method according to claim 1, wherein the abnormality condition includes at least one of a related condition of vessel plaque, myocardial bridge, aneurysm, stent, catheter, or wire.

11. A system for joint abnormality detection and physiological condition estimation from a medical image, comprising:
  a communication interface configured to receive the medical image acquired by an image acquisition device, wherein the medical image comprises an anatomical structure; and
  at least one processor, configured to:
    apply a joint learning model to determine an abnormality condition and a physiological parameter of the anatomical structure jointly based on the medical image, wherein the joint learning model satisfies a predetermined constraint relationship between the abnormality condition and the physiological parameter.

12. The system according to claim 11, wherein the joint learning model comprises:
  a joint feature extraction portion configured to extract a joint feature based on the medical image;
  an abnormality detection portion configured to determine the abnormality condition of the anatomical structure based on the extracted joint feature; and
  a physiological parameter prediction portion configured to determine the physiological parameter of the anatomical structure based on the extracted joint feature.

13. The system according to claim 11, wherein the joint learning model is trained using a joint training based on a data set with abnormality annotations and a data set with physiological parameter annotations, wherein a loss function of the joint learning model penalizes a divergence with respect to the predetermined constraint relationship between the abnormality condition and the physiological parameter.

14. The system according to claim 11, wherein the predetermined constraint relationship between the abnormality condition and the physiological parameter is modelled in a model structure of the joint learning model to reduce the divergence with respect to the predetermined constraint relationship between the abnormality condition and the physiological parameter.

15. The system according to claim 12, wherein the anatomical structure comprises a vessel, the joint feature includes a sequence of features at one or more positions along a centerline of the vessel, and a corresponding feature at each position includes at least one of a hand-crafted feature, a raw image, an automatically leaned feature, or a vessel mask,
  wherein the abnormality condition of the vessel includes at least one of an abnormality mask, an abnormality representative coordinate, an abnormality type, an abnormality position, or an abnormality size at the one or more positions along the centerline of the vessel,
  wherein the physiological parameter of the vessel includes at least one of a vessel functional parameter that is out of physiological functional status, a blood pressure, a blood velocity, a blood flow-rate, a wall-surface shear stress, a fractional flow reserve (FFR) parameter, an index of microcirculation resistance (IMR), an instantaneous wave-free ratio (iFR) parameter, a relative FFR change parameter or a relative iFR change parameter compared with an adjacent position at the one or more positions along the centerline of the vessel.

16. The system according to claim 13, wherein the anatomical structure comprises a vessel, wherein the loss function used by the joint training comprises a divergence loss term, and wherein the divergence loss term accumulates, for a position in a normal area of a centerline of the vessel, an absolute change value of a vessel functional parameter at the position compared with an upstream adjacent position.

17. The system according to claim 15, wherein the abnormality detection portion is configured to detect, for each position along the centerline line of the vessel, whether abnormality occurs at the position,
  wherein the physiological parameter prediction portion is configured to: predict, for each position, a change value of the vessel functional parameter at the position compared with its upstream adjacent position, and aggregate change values at its upstream positions, so as to determine the vessel functional parameter at the position, and
  wherein to predict the change value of the vessel functional parameter at the position compared with its upstream adjacent position, the physiological parameter prediction portion is further configured to:
    predict an initial change value of the vessel functional parameter at the position compared with its upstream adjacent position based on the joint feature;
    perform a first adjustment on the initial change value to obtain an intermediate change value, so that the intermediate change value falls within a predetermined range of the vessel functional parameter; and
    perform a second adjustment on the intermediate change value obtained from the first adjustment based on an abnormality occurrence position to obtain the change value, so that the predetermined constraint relationship is valid between the abnormality occurrence position and the change value obtained from the second adjustment.

18. The system according to claim 17, wherein the vessel functional parameter comprises the FFR parameter, wherein the first adjustment sets a predicted negative change value to zero, and wherein the second adjustment sets a non-zero change value at a normal position to zero or a value smaller than a predetermined threshold.

19. The system according to claim 12, wherein the joint feature extraction portion is further configured to extract the joint feature at least by:
receiving a sequence of initial feature information at one or more positions along the centerline of the vessel as an input, and extracting a feature map for the initial feature information at each position respectively, so as to obtain a sequence of feature maps at the one or more positions along the centerline of the vessel as the joint feature, wherein initial feature information at each position includes at least one of an image patch extracted at the position, a vessel mask, a hand-crafted initial feature, a semi-automatically extracted initial feature, or an automatically extracted initial feature; or
receiving the medical image including the vessel as an input, and acquiring a feature map at each position in the one or more positions along the centerline of the vessel for an area around the position, so as to obtain a sequence of feature maps at the one or more positions along the centerline of the vessel as the joint feature.

20. A non-transitory computer-readable storage medium storing computer-executable instructions thereon, wherein the instructions, when executed by a processor, performs a method for joint abnormality detection and physiological condition estimation from a medical image, the method comprising:
receiving the medical image acquired by an image acquisition device, wherein the medical image comprises an anatomical structure; and
applying a joint learning model to determine an abnormality condition and a physiological parameter of the anatomical structure jointly based on the medical image, wherein the joint learning model satisfies a predetermined constraint relationship between the abnormality condition and the physiological parameter.

* * * * *